Nov. 29, 1960 G. CANIVET 2,962,287
COIN-OPERATED ELECTRO-MECHANICAL GAME OF
SKILL, OF THE PINBALL MACHINE TYPE
Filed July 30, 1959 8 Sheets-Sheet 1

INVENTOR
G. Canivet
By Holcombe, Wetherill - Brisebois
ATTORNEYS

Nov. 29, 1960  G. CANIVET  2,962,287
COIN-OPERATED ELECTRO-MECHANICAL GAME OF
SKILL, OF THE PINBALL MACHINE TYPE
Filed July 30, 1959  8 Sheets-Sheet 4

INVENTOR
G. Canivet

ATTORNEYS

Nov. 29, 1960  G. CANIVET  2,962,287
COIN-OPERATED ELECTRO-MECHANICAL GAME OF
SKILL, OF THE PINBALL MACHINE TYPE
Filed July 30, 1959  8 Sheets-Sheet 5

INVENTOR
G. Canivet
ATTORNEYS

United States Patent Office 2,962,287
Patented Nov. 29, 1960

2,962,287
COIN-OPERATED ELECTRO-MECHANICAL GAME OF SKILL, OF THE PINBALL MACHINE TYPE

Gaston Canivet, 39 Rue Victor-Hugo, Carcassonne, France

Filed July 30, 1959, Ser. No. 830,617

7 Claims. (Cl. 273—119)

This invention relates to an electro-mechanical game of skill characterized by the fact that it comprises a plurality of movable elements, which may be miniature automobiles, for example. These may be movably positioned on a track inside a cabinet equipped with a coin operated release of a known type. These vehicles are electro-mechanically driven along their track by means of rolling balls periodically ejected by an appropriate distributor onto the upper end of an inclined platform. The player attempts to catch these balls on a projector which may consist of a miniature vehicle called a "pilot," actuated by means of a steering wheel.

As the balls traverse their trajectories they close contacts carried on fixed abutments or "pins." These contacts are connected to actuate electro-mechanical devices which effectuate the step by step advancement of the movable elements along the track, while simultaneously actuating two registers. One of these registers indicates the number of impulses received by the said fixed abutments or "pins" and consequently the score of the game; the other indicates the number of games won.

In order to clarify the following description it will be helpful to first describe how the game utilizing the invention is played.

This game consists in advancing the vehicles, which are lined up at the starting line on the track, toward the finish line at the other end of the track.

As soon as the player, after having introduced a coin or token into the coin operated starting means has closed the operating circuit, the distributor delivers the rolling balls at regular intervals and without stopping to the top of the inclined plane.

The player maneuvers the pilot vehicle by means of the steering wheel in an attempt to catch a ball in front of it. When he succeeds, the ball is catapulted forward and strikes one of the fixed contact-carrying abutments or "pins" which are mounted on the inclined plane.

All of the balls cannot be caught by the pilot vehicle or projector, just as all of those which are caught will not necessarily strike one of the fixed abutments or "pins." It is this feature which makes the game difficult and manifests the skill of the player.

The blows against the front of each fixed abutment or "pin" advance the corresponding vehicle on the track by short jumps. Each jump is recorded by the register provided for that purpose.

When one of the vehicles on the track arrives at the goal before the expiration of a predetermined time, a game is won. All of the vehicles on the track automatically return to the starting point, the register which records the impulses received by the fixed abutments returns to zero and the second register records the game won. The mechanism does not stop, the balls continue to be thrown out, and the player may start a new game.

When no vehicle reaches the goal line within the predetermined time, the mechanism stops, the balls are no longer supplied, and the game is over.

A new game cannot be begun until a new token or coin is placed in the coin-operated release, which has the following effects:

(1) The register which records the total number of impulses received by the fixed abutments or "pins" is turned back to zero.

(2) The apparatus is again started up.

The attached drawings show by way of example one embodiment of the invention in which.

By referring to the drawings, it will be seen that the apparatus constituting the invention comprises a cabinet 1, the upper wall of which is transparent. Inside this cabinet is an inclined platform 3 supported by any appropriate means. A transverse track 4 for the miniature vehicles 5 extends across the back of the cabinet 1. The platform 3 carries abutments or "pins" 6 on its middle portion. The number of these abutments or "pins" corresponds to the number of vehicles 5. Each of these abutments is provided with contact means 7 connected to one of the vehicles 5 through an electro-mechanical device shown in detail on Figs. 3 and 4. This apparatus as a whole is designated by reference numeral 8 and acts to move the corresponding vehicle 5 to which it is connected each time one of the contact means is actuated.

Figure 13:
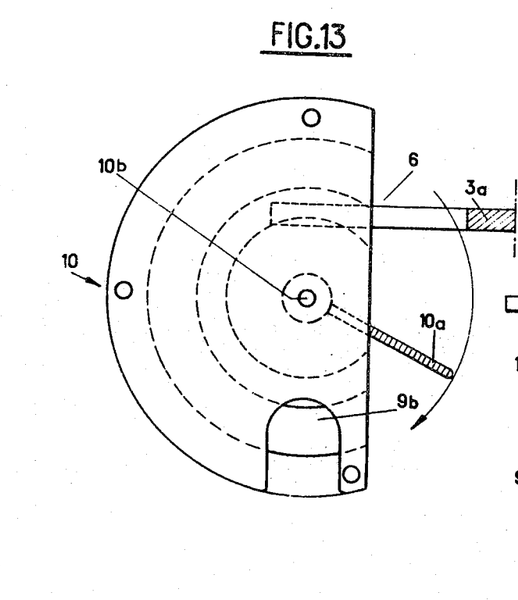
Figs. 13 and 14 show the means for distributing the balls in elevation and in cross-section, respectively.
Figure 14:
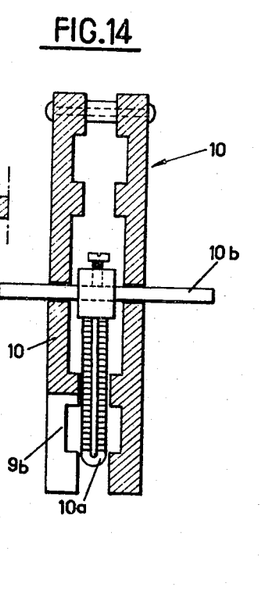

A transverse gutter 9 is positioned at the lower end of the inclined platform 3 and extends backward at 9a along one of the longitudinal sides of the cabinet to terminate at 9b in the lower part of a distributor 10 shown in detail on Figs. 13 and 14, this distributor comprising a flexible rotating arm 10a mounted on a shaft 10b.

In back of the gutter 9 is a support 11 slidably mounted on a guide rail 12. A pilot vehicle 13 called the projector is fixed to this support and controlled by means of a cable 14 actuated by a steering wheel 15.

The game consists in advancing the vehicles 5 from the starting line 16 on the track to the finish line 17 at the other end of the track.

As hereinbefore indicated, the apparatus is started by introducing a coin or token into the coin-operated releasing means. This starts the distributor 10 turning to continuously throw out onto the inclined platform 3, at regular intervals, balls 18 coming from the inclined gutters 9 and 9a. These balls roll about freely zigzagging as impelled by their own weight, down the inclined plane 3, between the pins 6.

Figure 5:
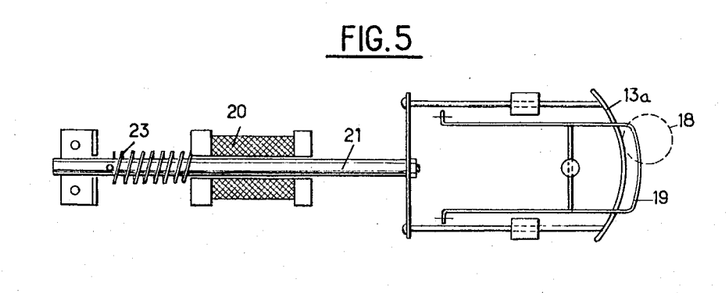
Fig. 5 shows the mechanism of the pilot vehicle partly in plan and partly in section.
Figure 6:
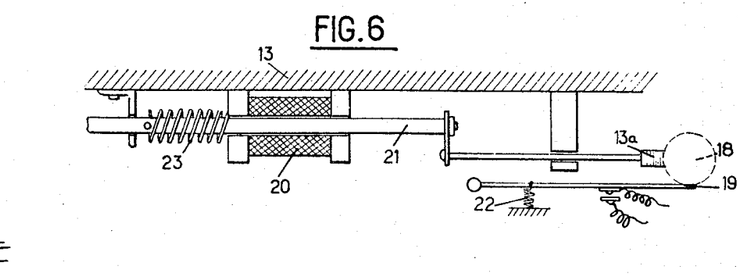
Fig. 6 is an elevational view of the elements shown in Fig. 5.

By maneuvering the pilot vehicle or "projector" 13 by means of the steering wheel 15, the player attempts to catch the balls one by one on the end 13a of this vehicle. When he succeeds, the ball caught by the projector closes the contact 19, completing a circuit through the solenoid 20 which repels its core 21, on one end of which the pusher 13a is mounted. This sudden repulsion of the pusher drives the ball forward; the contact 19, being then freed from the weight of the ball, is returned to its rest position by a spring 21 and cuts off the current. A spring 23 retracts the core 21 and consequently the pusher 13a. The pilot vehicle is then ready to catch and propel another ball.

Figure 7:
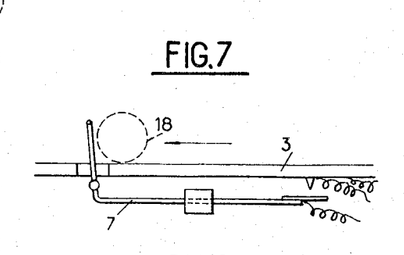
Figs. 7 and 8 show the operation of the double acting switch, which simultaneously starts the means for advancing the vehicles and the register.
Figure 8:
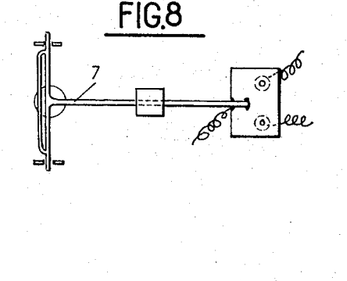

If the ball propelled by the pusher 13a of the pilot vehicle 13, in its rising trajectory, encounters the front of one of the fixed vehicles or pins 6 this actuates the double acting contact 7 of Figs. 7 and 8, thus producing an electrical impulse in:

(1) A solenoid 24 which controls the advance of the vehicles on the track 5.

Figure 9:
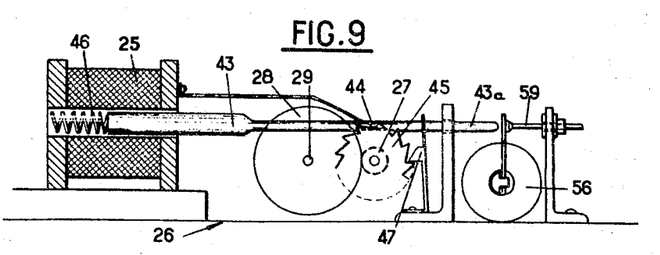
Figs. 9 and 10 are side and plan views of this register.
Figure 10:
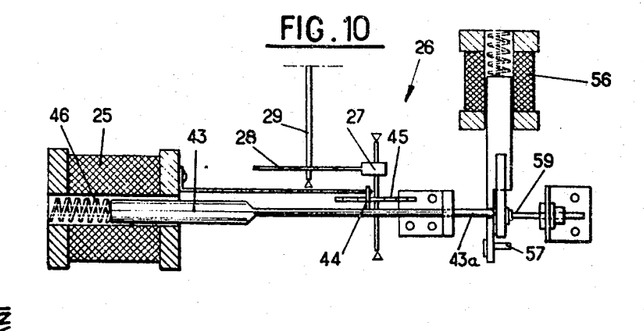
Figure 11:
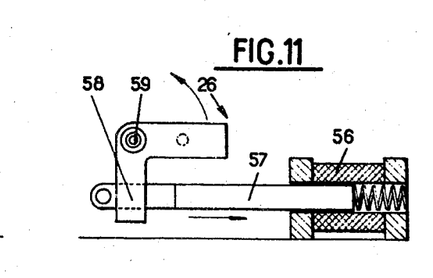
Fig. 11 is an end view thereof.

(2) A solenoid 25 controlling the register 26 shown in Figs. 9, 10 and 11.

Figures 3, 4:
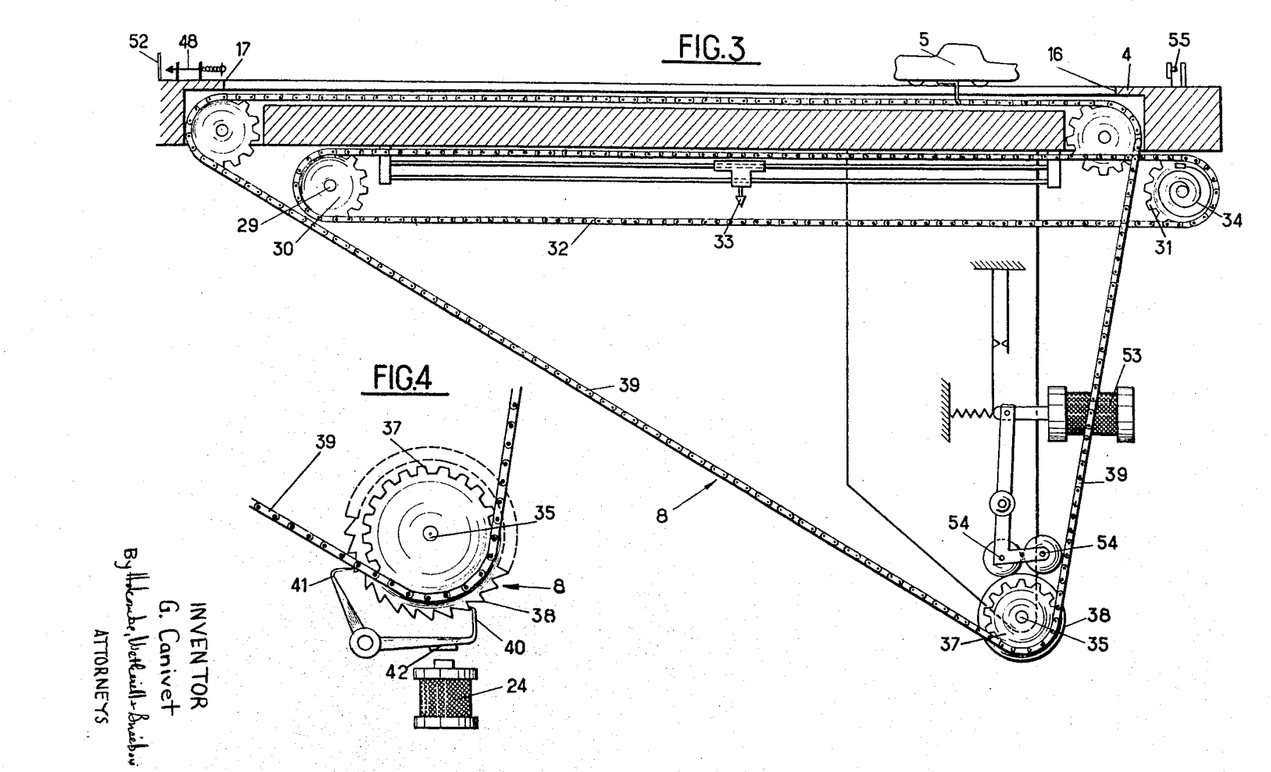
Fig. 3 is a partial cross-section taken along the line III—III of Fig. 1 showing the details of the chain transmissions.
Fig. 4 shows the details of the ratchet wheels actuating the vehicles on the track.

The register 26 comprises the electro-mechanical assembly of Figs. 9, 10 and 11, connected by the gears 27, 28 and the shaft 29, to the transmission system comprising wheels 30, 31, endless chain 32 and indicator 33 of Fig. 3.

The wheel 31 is biased by a spiral spring 34 which tightens during the forward movement of the indicator 33 and draws it back when it has arrived at the end of its course.

Figure 1:
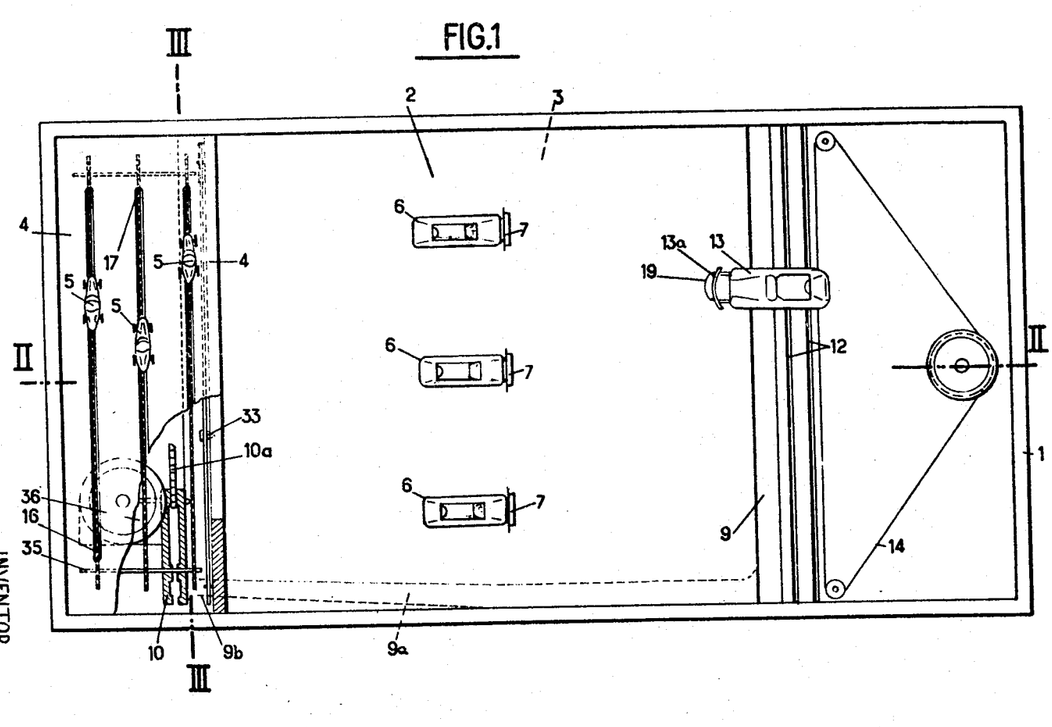
Fig. 1 is a plan view.
Figure 2:
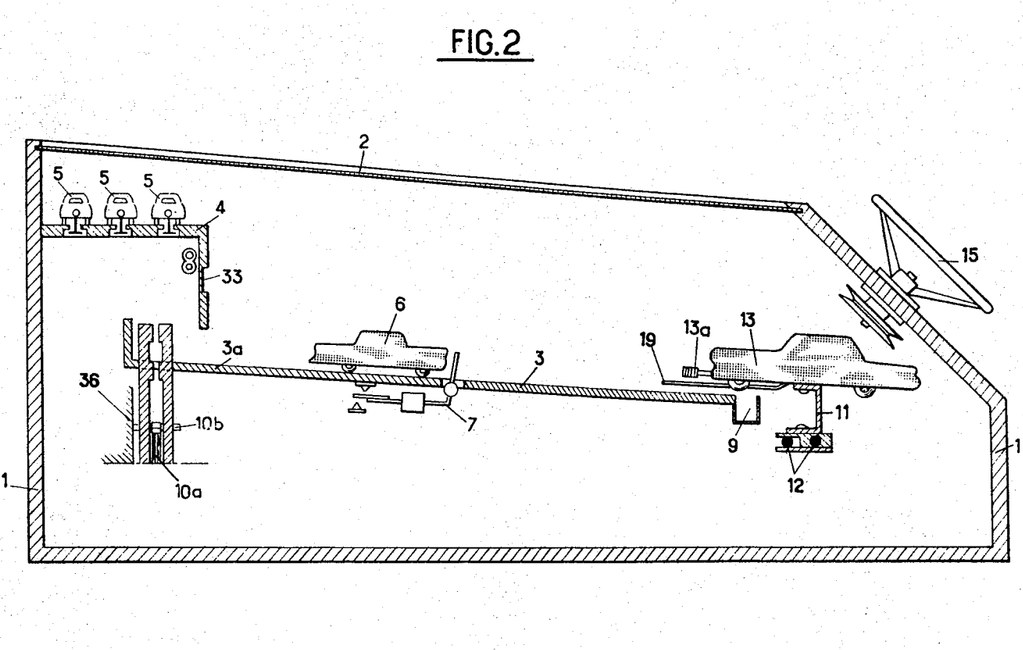
Fig. 2 is a longitudinal cross-section taken along the line II—II of Fig. 1.

The shaft 35, shown on Figs. 3 and 4, is continuously driven through intermediate gearing by the motor 36, which is not shown on these figures, but may be seen on Fig. 1.

A pair of wheels 37 and 38 are fixed to each other and frictionally mounted on this shaft, the former driving an endless chain 39 to which the vehicles 5 are attached and the latter being a ratchet wheel which cooperates with an escapement, the end pawls of which are designated by reference numerals 40 and 41.

These wheels can be turned by rotation of the shaft 35 when the pawl 40 releases the wheel 38. This release is accomplished by passing current through the solenoid 24, which attracts the blade 42 fixed to the pawl 40. The shaft 35 then drives the wheels 37 and 38 and with them the chain 39 and the vehicle 5 fixed thereto.

This takes place only for the fraction of a turn equal to the pitch of a tooth of the ratchet wheel 38, for at the same time that the pawl 40 of the escapement releases one tooth, the second escapement pawl 41 engages the ratchet wheel and stops any further rotation of the wheels 37 and 38.

The particular vehicle on the track which corresponds to the excited solenoid 24 has thus been advanced one step.

The electrical impulse is instantaneous, since the ball does not remain in contact with the front of the fixed vehicle 6. The pawl 40 then falls again in front of the next tooth on the wheel 32 and again immobilizes the wheels 37 and 38. Another contact between a ball and the front 7 of one of the vehicles 6 is required to further advance one of the trackway vehicles 5.

Since the contact 7 is of the double action type an impulse has also been sent to the solenoid 25 of the register 26 (Figs. 9 and 10).

The core 43 of the solenoid 25 has been forced forward and, acting through the pin 44, has turned the ratchet wheel 45 through the pitch of one tooth. Since the electrical action is instantaneous, the core returns to its starting position, to which it is drawn by the spring 46. The ratchet wheel is then immobilized by the pawl 47.

The rotation of the ratchet wheel 45 acts through the gears 27 and 28 to drive the indicator 33 along its scale.

Since each of the vehicles 5 is driven by an identical device 8 in the same manner as has been described (by means of a solenoid, escapement, ratchet wheel and endless chain), it will be readily understood that whenever a ball hits one of the fixed vehicles 6 on the platform 3, it advances the corresponding trackway vehicle 5.

The register 26 is independently actuated upon the advancement of any one of the trackway vehicles 5, and records the total of these individual advancements.

Figures 15, 16, 17, 18, 19:
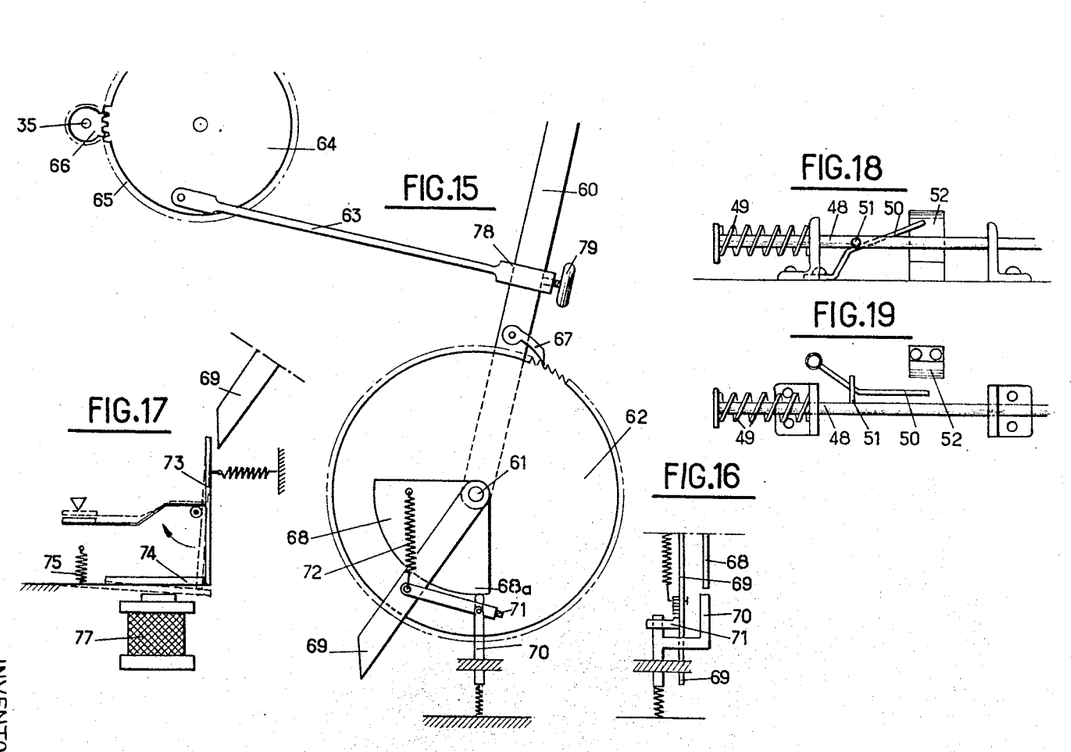
Fig. 15 shows the clockwork schematically.
Fig. 16 shows the subject matter of Fig. 15 in detail.
Fig. 17 shows the main contactor actuated by the clockwork.
Figs. 18 and 19 show in plan and elevation respectively the quick-action reversing contact at the end of the track.
Figure 20:
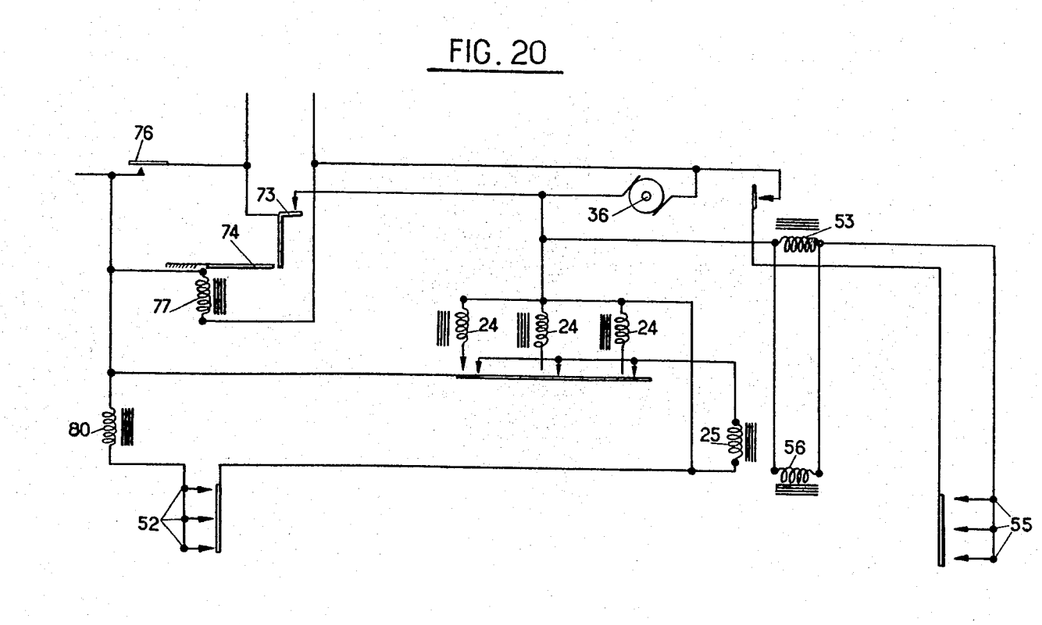
Fig. 20 is an electrical diagram of the apparatus.

Whenever any one of these trackway vehicles 5 arrives at the goal 17, it encounters a quick acting contact shown in Fig. 18, driving back the rod 48 and compressing the spring 49. The rod travels alongside a guide member 50 on which slides a lug 51 fixed to the rod 48. When it passes beyond the guide, this lug 51 falls and instantaneously completes a contact with the element 52 and is then returned to its initial position by the spring 49.

Figure 12:
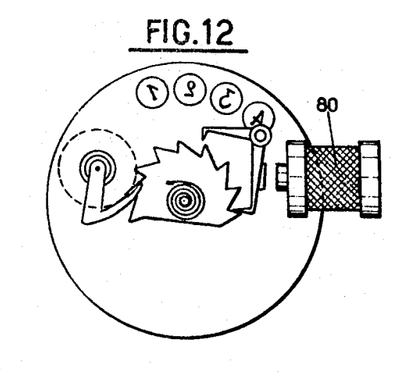
Fig. 12 shows the mechanism for counting the total number of games.

The purpose of this contact is to energize the solenoid 53 which actuates the reversing means 54. If the wheels 37 and 38 driven by the shaft 35 cannot turn in one direction because of the pawl 40, they may nevertheless turn in the opposite direction, the pawl being effective in only one direction. It follows that their rotation in this opposite direction continuously draws the trackway vehicles 5 back to the starting line where, upon contacting the spring biased button 55, they energize the solenoid 53, which shifts the mechanism to forward gear, and also energize the solenoid 80 of the game register shown in Fig. 12. Neither of these events can take place until the trackway vehicles have returned to the starting line 16.

Moreover, closing of the contact 52 (Figs. 18 and 19) has simultaneously energized the solenoid 56 which draws in the core 57 which draws with it the member 58 which pivots about the shaft 59. The horizontal portion of the member 58 lifts up and permits the extension 43a of the core 43, which rests thereagainst, to move forward under pressure from the spring 46, so that the pin 44 pushes back the holding pawl 47, thus releasing the ratchet wheel 45 and simultaneously permitting the elements which constitute the register 26 to be turned backward by the spiral spring 34.

The motor 36 continues to turn, and the balls keep on being served to the player who may then start a second game.

The clockwork which limits the time allowed for the game (Figs. 15 and 16) comprises an arm 60 articulated on the same shaft 61 as a ratchet wheel 62, with respect to which it turns independently.

This arm is oscillated by a connection rod 63 articulated on the periphery of a wheel 64 connected to the drive shaft 35 through gears 65 and 66.

At each oscillation a spring biassed pawl 67 turns the ratchet wheel 62 for one or more teeth.

When this wheel has turned through a complete revolution, the assembly 68 and 69 is in the position shown in Figs. 15 and 17, and a spring biassed stop 70 stops the member 71 fixed to the finger 69. The wheel 62 continues to turn, driving the member 68 and thus tightens the spring 72. When the end 68a of the member 68 reaches the right of the stop 70, it pushes this stop downward, thus releasing the member 71 and consequently the finger 69. The latter, suddenly released, and biassed by the spring, returns to its original position, brushing in passing against the contact 73 which interrupts the current in the apparatus, thus stopping the motor 36.

The member 74, biassed by the spring 75, then rises up, stopping the member 73 from returning to its original position and from reestablishing the current to the motor (position shown in broken lines on the drawing).

The length of the playing time depends on the time required for the ratchet wheel 62 to complete a revolution. This time may be regulated by moving the connecting rod 63 along the oscillating arm 60, to which it is attached by means of a collar 78 provided with a set screw 79. It will be readily understood that the higher the connecting rod is set, the smaller is the angular displacement of the oscillating arm and the shorter the path travelled by the pawl, so that the consequent rotation of the ratchet wheel is smaller.

What is claimed is:

1. A pinball machine comprising a cabinet, an inclined platform and a trackway within said cabinet, a plurality of fixed pins on said platform and a corresponding number of movable racers on said trackway, means for repeatedly advancing each racer a discrete distance less than the length of the trackway, electrical contact means on each pin, an electrical circuit for actuating each advancing means, each of said circuits being completed by closing of one of said electrical contact means, means for successively delivering a plurality of balls to said platform at regularly spaced intervals, movable ball engaging means within said cabinet, and control means therefor extending through a wall of said cabinet, said ball engaging means being provided with projecting means actuated upon contact with a ball to propel said ball along said platform and against said pins to close said electrical contact means.

2. A pinball machine as claimed in claim 1 provided with sloping gutters which return to said delivering means those balls which have traversed said platform.

3. A pinball machine as claimed in claim 2 provided with coin actuated means for driving said ball distributor and adjustable timing mechanism the setting of which determines the length of time said ball distributor will operate when a coin is inserted.

4. A pinball machine as claimed in claim 1 comprising a register provided with an indicator and electrical means for advancing said indicator and electrical circuits connecting said electrical means through each of said contact means to a power source, so that said indicator is advanced each time a ball strikes and closes any one of said contact means.

5. A pinball machine as claimed in claim 4 comprising additional contact means at the end of the path of travel of each racer and a second register equipped with an indicator and indicator advancing means, said additional contact means being connected in a circuit between a power source and the indicator advancing means of said second register, so that the indicator of said second register is advanced each time a racer reaches the end of its path of travel and strikes said additional contact means.

6. A pinball machine as claimed in claim 5 comprising means for reversing the direction of drive of each racer advancing means, said reversing means being connected to a power source through the second contact means at the end of the path of travel of the same racer, so that each racer is automatically returned to its starting point when it reaches the end of its path of travel and closes the corresponding second contact.

7. A pinball machine as claimed in claim 6 comprising electrically actuated means for returning said first mentioned register to zero, each of said second contact means being connected in a circuit between a power source and said zero returning means so that said first mentioned register is automatically returned to zero whenever a racer comes to the end of its path of travel and closes the corresponding second contact means.

References Cited in the file of this patent

UNITED STATES PATENTS

| | | |
|---|---|---|
| 2,098,406 | Slezak | Nov. 9, 1937 |
| 2,526,215 | Florimont | Oct. 17, 1950 |
| 2,627,411 | Bartlam et al. | Feb. 3, 1953 |
| 2,732,210 | Heide | Jan. 24, 1956 |
| 2,910,296 | Irwin | Oct. 27, 1959 |